Fig. 1.
Fig. 2.
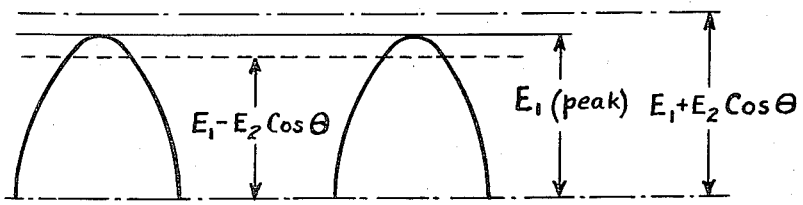
Fig. 3.
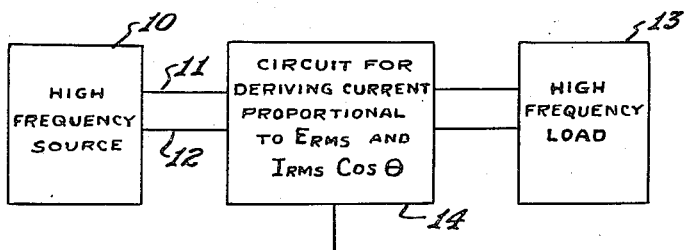
Fig. 4.
INVENTOR.
JOSEPH C. FROMMER.
BY
ATTORNEYS.

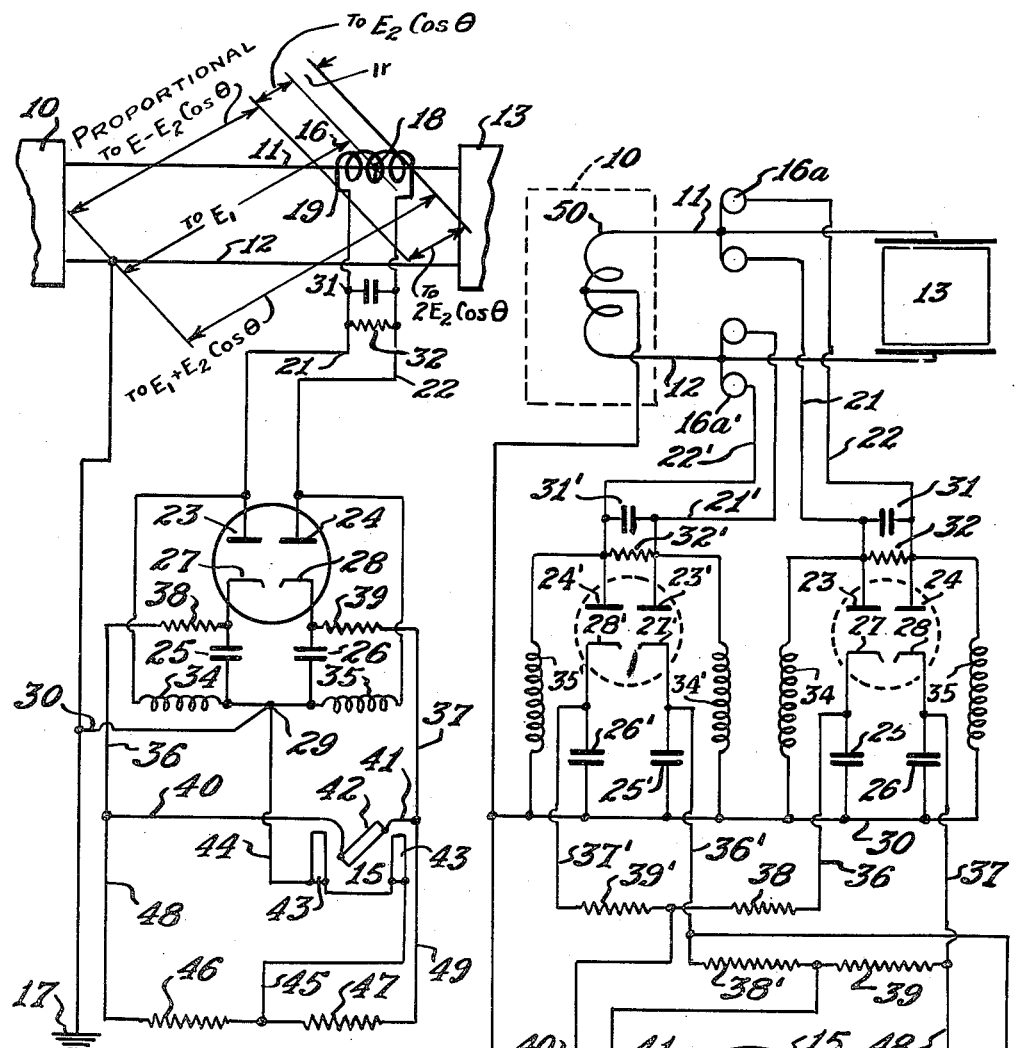

Patented Feb. 12, 1952

2,585,001

UNITED STATES PATENT OFFICE 2,585,001

APPARATUS FOR THE MEASUREMENT OF HIGH-FREQUENCY POWER

Joseph C. Frommer, Cincinnati, Ohio

Application October 8, 1948, Serial No. 53,582

12 Claims. (Cl. 171—95)

My invention has for its principal object the provision of a simple method and apparatus by which power, supplied at a frequency for example of from 10 kilocycles to 100 megacycles, may be measured within desired limits of accuracy.

The usual method of measuring power for circuits of commercial low frequency, i. e. by means of a wattmeter of the electrodynamometer type, is unsatisfactory when power is supplied at high frequencies. Various methods for the measurement of power at high frequencies have been suggested, most of them being designed for use in the field of communications. Of those which I have reviewed, some require circuit elements which are not commercially available and which require a high degree of technical ability to design, construct and maintain. Some, by reason of their complexity are limited to laboratory use, while others are dependent for their accuracy upon the services of technicians who are specially trained in instrument inspection and maintenance and who are adept in testing and making compensation for changes in the characteristics of the electronic or other elements involved in the apparatus.

There has not hitherto been available any simple apparatus for the measurement of high frequency power which can be employed in regular practice by the non-technically trained operator. There is need for such a method and apparatus in many fields, for example in the field of diathermy in connection with which I shall describe an exemplary embodiment of my invention.

It is an object of my invention to provide a method and apparatus for the measurement of power at high frequencies, which method is simple and easily practiced, and which apparatus is sturdy and stable in operation.

It is an object of my invention to provide a method and apparatus in which a conventional wattmeter may be used for the measurement of high-frequency power.

The above and other objects of my invention which are set forth hereinafter or will be apparent to one skilled in the art upon reading these specifications, I accomplish by that construction and arrangement of parts and by that procedure of which I shall now describe the aforesaid exemplary embodiment. Reference is made to the accompanying drawings wherein:

Figure 1 is a vector diagram representing the quantitative relation utilized in my invention.

Figure 2 is a diagram showing the application of electrical values to the diagram of Figure 1.

Figure 3 is a graph showing the relative values of the primary current and the two quantities of derived and rectified current.

Figure 4 is a block diagram of a high-frequency supply, load and measurement arrangement.

Figure 5 is a circuit diagram of our preferred mode of measuring high frequency power.

Figure 6 is a modification of Figure 5 showing a circuit in which neither side is grounded.

Figure 7 is a modification of a conventional type of electrodynamometer in which line losses due to its location are compensated.

The considerations underlying the development of my invention are as follows: Power in the ordinary alternating current circuit is represented by $EI \cos \theta$, in which E and I are the root mean square values of voltage and current respectively and $\theta$ is the phase angle. In the practice of my invention I derive from a power circuit a current which is proportional to the product of the high frequency load current I and $\cos \theta$, rectify this derived current, and apply it to the moving coil of an electrodynamometer type of wattmeter. I also derive a second current which is proportional to the high frequency line voltage and apply this current to the stationary coil of the wattmeter.

In connection with the requirement for a current which is proportional to the product of the high frequency load current I and $\cos \theta$, I take advantage of the fact that, having a vector quantity such as AB of Figure 1, if a second vector of relatively small value such as BC is derived, the two quantities when added vectorially are, to a sufficiently close degree of approximation:

$$AB + BC \cong AB + BC \cos \theta \quad (1)$$

Similarly with respect to a second small vector quantity BD which is equal and of opposite sense to BC:

$$AB - BD \cong AB - BD \cos \theta \quad (2)$$

In Figure 2 the vector AB represents a line voltage $E_1$. The vector BC represents a value of voltage $E_2$ which is derived from the line voltage by means which will be described hereinafter. A second value of $E_2$, equal to the first but opposite in phase, is represented by BD.

Substituting these electrical values in (1) and (2) above $$E_1 + E_2 \cong E_1 + E_2 \cos \theta \quad (3)$$

and $$E_1 - E_2 \cong E_1 - E_2 \cos \theta \quad (4)$$

When each of the two currents which are proportional to the right hand members of (3) and (4) is rectified and the smaller direct current subtracted from the larger:

$$(E_1+E_2 \cos \theta) - (E_1-E_2 \cos \theta) = 2E_2 \cos \theta \quad (5)$$

The remainder of $2E_2 \cos \theta$ represents a direct current which is proportional to $I \cos \theta$.

When the average of the two currents of (3) and (4) is taken $$\frac{(E_1+E_2 \cos \theta)+(E_1-E_2 \cos \theta)}{2}=E_1 \quad (6)$$

this average value is proportional to the line voltage.

Thus, if two equal voltages $E_2$, opposite to each other and in phase with the high frequency current and proportional thereto are added vectorially to the high frequency line voltage, the two quantities required for measurement of the power supplied; viz. $E_1$ and $I \cos \theta$ are obtained. This may be accomplished by relatively simple and wholly dependable means, which can be added to a high frequency source-load circuit. In Figure 4, the numeral 10 represents a high frequency source, connected by leads 11 and 12 to a high frequency load 13. Circuit elements for deriving the currents mentioned are diagrammatically indicated at 14, and an electrodynamometer upon which the high frequency power may be read is indicated at 15.

Referring to Figure 5, the circuit elements for deriving the two currents comprise a transformer secondary winding 16 placed about a transformer primary (not illustrated as such) in series with an ungrounded one 11 of the power leads. If the other lead 12 is not grounded in normal service, I ground it as at 17. The winding 16 has a center tap which is electrically connected with the lead 11 as at 18. The end terminals 19 and 20 of the winding are connected by leads 21 and 22 to the cathodes 23 and 24 of a pair of diode rectifiers, which if desired may be located in the same envelope. Capacitors 25 and 26 are placed respectively in the circuits of the anodes 27 and 28 of the rectifiers, which circuits are then connected together as at 29 and to ground through the lead 30.

When high frequency energy is supplied to the load 13 a voltage which is small with respect to the line voltage because of the design of the current transformer having the secondary 16, is induced in the transformer winding. By reason of the center tap 18 of the transformer, this voltage is divided into two equal and opposite portions represented by BC and BD in Figure 1. A voltage represented by AB plus BC is applied to the rectifier 23—27 and a voltage AB plus BD to the rectifier 24—28. The condenser 25 in the output circuit of the diode 23—27 is thus charged to a value proportional to AB plus BD, and the condenser 26 is charged to a value proportional to AB plus BC. Thus two voltages are available, one between points 28 and 29 which may be the sum of $E_1$ and $E_2 \cos \theta$ and the other between points 27 and 29 which may be the difference of these two quantities. From (3) above Voltage $28—29 = AB + BC = E_1 + E_2 \cos \theta$ (7)

and from (4) above

Voltage $27—29 = AB + BD = E_1 - E_2 \cos \theta$ (8)

The relative value of these quantities with respect to the high frequency line voltage $E_1$ is graphically represented in Figure 3.

To assure correct measurement of the high frequency power it is essential that the voltage $E_2$ derived from the line is in phase with the primary current. There are various methods by means of which this phase correction may be obtained. The preferred arrangement, shown in Figure 5, involves the installation of a condenser 31 and a resistance 32 across lines 21 and 22. The cathodes 23 and 24 are respectively grounded through inductances 34 and 35. It is necessary now to calculate the capacity of the condenser 31 in relation to the other electrical values of the secondary circuit.

The value of the derived voltage $E_2$ is determined by the mutual flux between the primary coil and the secondary coil 16 of the transformer, the stray inductance of the secondary, the resistance R and the capacitance of the phase-restoring condenser. It is expressed in the relationship:

$$E_2+jLw\left(\frac{E_2}{R}+E_2jCw\right)=IjMw \quad (9)$$

in which: $I$ is the primary current in the line 11, $M$ is the mutual inductance between the primary and secondary 16 of the transformer, $L$ is the stray inductance of the secondary, $R$ is the value of the ohmic resistance 32 and $C$ is the value of the capacitance of the condenser 31. The angular velocity of the high frequency current $(2\pi f)$ is denoted by $w$ and the operator $j$ represents $\sqrt{-1}$. Extracting $E_2$ from the expression in (9), $$E_2\left(1+j\frac{Lw}{R}-LCw^2\right)=jIMw \quad (10)$$

The value of $C$ is chosen so that $$LCw^2=1 \quad (11)$$

then $$E_2\left(j\frac{Lw}{R}\right)=jIMw \quad (12)$$

from which is obtained:

$$E_2=IR\left(\frac{M}{L}\right) \quad (13)$$

Selection of the value of $C$ as in (11) above has resulted in the elimination of the $j$ terms and, as indicated in (13) by elimination of these $j$ terms, the derived voltage $E^2$ is in phase with the primary current $I$.

By judicious choice of values for $L$, $C$ and $R$ it is possible to obtain circuit values which, within the variations of $w$ encountered in the operation of well designed equipment, will not affect the accuracy of the measurement. The coils 34, 35 are provided to neutralize the capacity to ground of lines 21, 22 and cathodes 23, 24.

The two voltages available as the outputs of rectifiers 23—27 and 24—28; $(E_1 + E_2 \cos \theta)$ and $(E_1 - E_2 \cos \theta)$ respectively are applied, through lines 36 and 37 containing suitable resistances 38 and 39, and leads 40 and 41 to the opposite ends of the moving coil 42 of the electrodynamometer 15. The resultant current through this coil is $$(E_1+E_2 \cos \theta) - (E_1-E_2 \cos \theta) = 2E \cos \theta$$

as indicated in the vector diagram of Figure 2. This value is proportional to $I \cos \theta$ of the high frequency supply.

The stationary coil of the dynamometer is grounded at one end by lead 44, and at the other is connected by a lead 45 to the center tap between two resistances 46 and 47, respectively connected by leads 48 and 49 to leads 36 and 37. The stationary coil thus is in series with the voltage $(E_1+E_2 \cos \theta)$ through a circuit containing resistance 46, and also in series with the voltage $(E_1-E_2 \cos \theta)$ [which is in parallel with $$(E_1+E_2 \cos \theta)]$$

through a circuit containing resistance 47 which is equal to resistance 46.

As has been shown, the two voltages available as the outputs of rectifiers 23—27 and 24—28, $(E_1+E_2 \cos \theta)$ and $(E_1-E_2 \cos \theta)$ respectively, are applied to the moving coil 42 of the electrodynamometer. The resultant current through this coil is $$(E_1+E_2 \cos \theta) - (E_1-E_2 \cos \theta) = 2E_2 \cos \theta$$

as indicated in the vector diagram of Figure 2. This value is proportional to $I \cos \theta$ of the high frequency supply. The stationary coil of the electrodynamometer is placed in series with the two voltages $(E_1+E_2 \cos \theta)$ and $(E_1-E_2 \cos \theta)$, in a parallel circuit. The series circuit of the first of these voltages is through resistance 46. The current flowing in this circuit and the voltage drop across the resistance 46 is thus proportional to $(E_1+E_2 \cos \theta)$. The series circuit of the second of these voltages is through the resistance 47. The current in this circuit and the voltage drop across 47 is thus proportional to $(E_1-E_2 \cos \theta)$. Hence the current flowing through line 45 and the stationary coil 43 of the electrodynamometer consists of two portions which are, if we neglect the ohmic resistance of the stationary coil 43, $(E_1+E_2 \cos \theta)/R46$ and $(E_1-E_2 \cos \theta)/R47$. Since the two resistances 46 and 47 are equal, the current in this coil is found to be $2E_1/R$ as required by (6) above. With a direct current proportional to $I \cos \theta$ flowing in the moving coil of the electrodynamometer and a voltage proportional to $E_1$ applied to the stationary coil, the meter indication will be the product of these two quantities, which is the power in the high frequency circuit.

In many applications, neither of the high frequency power lines 11 and 12 is at ground potential. Instead, both are maintained symmetrical with respect to ground with the source tapped and grounded at the midpoint. In such an arrangement, due to the possibility of high frequency current passing from the source 10 to the load 13 through ground, it is improper to attempt power measurement by deriving a current which is proportional to the load current in one power line only. Under these conditions, I provide a substantial duplicate of the arrangement hereinabove described for line 11 for line 12 also as shown in Figure 6. In this system the power in each line could be indicated separately by the dynamometer as the product of the current and the voltage between its particular lead and ground and the power factor in each line. The total power is obtained by adding the readings obtained when the electrodynamometer is switched from one side of the line to the other.

In numerous cases sufficient accuracy is obtained by finding the average of the two voltages and multiplying this value by the average of the two currents. Although the product of the two averages is not necessarily equal to the average of the two products, the former may be taken for the latter, when the two systems have values which are sufficiently close together, without appreciable error. For example, if the voltages to ground of the two leads are 0.9 and 1.1 and the currents flowing through these leads are 1.1 and 0.9 respectively, then the average of the actual wattages is $[(0.9 \times 1.1)+(1.1 \times 0.9)]/2=0.99$. If instead of multiplying the voltage and current of each line, and taking the average, the average voltage had been multiplied by the average current; $(0.9+1.1)/2 \times (1.1+0.9)/2=1.0$, the error in the latter result is one percent (1%). Similarly, if the wattages supplied by the two lines were $(0.9 \times 0.9)$ and $(1.1 \times 1.1)$ with an average of $(0.81+1.21)/2=1.01$; then the product of the average voltage and average current 1.0 would again be in error by only one percent (1%). It is to be observed that, in the above exemplifications the deviations of the current and voltage values are ten percent (10%) and still the resultant error is only one percent (1%). It appears, therefore, that these averages of voltage and of current may be utilized.

In Figure 6, like parts have been given like index numerals, and the second or duplicate arrangement of parts is indicated by primed numerals. The high frequency output coil in the high frequency source is indicated at 50. It has a center tap which is grounded at 17. There will be a transformer primary in series with each of the power leads 11 and 12 (not shown). The two secondaries, one associated with each of the primaries, are indicated at 16a and 16a'. The various parts of the duplicate circuits will be clear from the description given above, each circuit being like that explained in connection with Figure 5.

The electrodynamometer, with its attendant connections may be arranged to be switched from one circuit to the other, or may be connected to give average readings by the arrangement shown. Lead 30 becomes a common ground connection. Resistors 38 and 39' and resistors 39 and 38' respectively are coupled together to the moving coil leads 40 and 41. Leads 48 and 49 containing the resistors 46 and 47 are connected to opposite ends of either of the foregoing pairs of resistors, or alternatively to either pair.

It is important, in order to keep the wattage requirement of the measuring circuit low, to use an electrodynamometer which has the highest sensitivity. The sensitivity of the conventional meter can be substantially increased by providing an iron core 51, in Figure 7, to reduce the reluctance of the magnetic circuit. This iron core should be of uniform permeability and negligible remanence.

In many applications such as, for example, diathermy, it is desired to measure the power applied to the load and to have the measurement equipment located adjacent to the control at the high frequency power source. In this arrangement the actual power in the load is equal to the power at the source less the amount lost in the line. In Figure 7 there is shown an improved electrodynamometer 15a which, in addition to the conventional stationary coils 43, is provided with auxiliary coils 52, similarly connected in series. These latter coils are supplied with a desired current, from an external source (not shown), the value of which, is, when "multiplied" by the current in the pivoting coil 42, proportional to the losses between the source 10 and the load 13.

Modifications may be made in my invention without departing from the spirit of it. For example, connections of the average plate current and of the high frequency voltage to the watt meter may be interchanged as an alternate arrangement of my invention. Also, the connections to the diode rectifiers could be reversed, i. e.

ground the cathodes and connect the anodes to the leads coming from the inductive coil. Having thus described my invention in certain exemplary embodiments, what I claim as new and desire to secure by Letters Patent is:

1. In apparatus for the purpose described, inductive means for deriving from an ungrounded lead of a high frequency power circuit two currents respectively proportional to the product of the high frequency load current and the cosine of its phase angle, and proportional to the high frequency line voltage, rectifying means in connection with said derived currents, and an electrodynamometer to which said currents are differentially applied, the said means for deriving said currents comprising a transformer having a primary in series in said ungrounded power lead, and a secondary having a center tap connected directly with said power lead.

2. Apparatus as claimed in claim 1 in which the ends of said secondary are connected directly with separate rectifying means respectively.

3. Apparatus as claimed in claim 1 in which the ends of said secondary are connected directly with separate rectifying means respectively, there being a capacity and a resistance connected in parallel across said last mentioned connections.

4. Apparatus as claimed in claim 1 in which the ends of said secondary are connected directly with separate rectifying means respectively, there being a capacity and a resistance connected in parallel across said last mentioned connections, the output circuits of said separate rectifiers each containing capacity to ground, and neutralizing inductances shunting said capacities and said rectifiers respectively.

5. Apparatus as claimed in claim 1 in which the ends of said secondary are connected directly with separate rectifying means respectively, there being a capacity and a resistance connected in parallel across said last mentioned connections, the output circuits of said separate rectifiers each containing capacity to ground, and neutralizing inductances shunting said capacities and said rectifiers respectively, and connections from said output circuits to the coils of said electrodynamometer.

6. Apparatus as claimed in claim 1 in which the ends of said secondary are connected directly with separate rectifying means respectively, there being a capacity and a resistance connected in parallel across said last mentioned connections, the output circuits of said separate rectifiers each containing capacity to ground, and neutralizing inductances shunting said capacities and said rectifiers respectively, and connections from said output circuits to the coils of said electrodynamometer, the moving coil of said electrodynamometer being connected across said last mentioned connections, and the fixed coils of said dynamometer being connected in series between the midpoint of a resistive network between said last mentioned connections, and ground.

7. Apparatus as claimed in claim 1 in which the ends of said secondary are connected directly with separate rectifying means respectively, there being a capacity and a resistance connected in parallel across said last mentioned connections, the output circuits of said separate rectifiers each containing capacity to ground, and neutralizing inductances shunting the stray capacities of said rectifiers respectively, and connections from said output circuits to the coils of said electrodynamometer, the moving coil of said electrodynamometer being connected across said last mentioned connections, and the fixed coils of said dynamometer being connected in series between the midpoint of a resistive network between said last mentioned connections, and ground, said last mentioned connections also containing resistances respectively located therein ahead of said connections to said electrodynamometer.

8. In a power measurement system for high frequency circuits, in combination with a high frequency circuit having power leads, inductive means for deriving currents from an ungrounded one of said power leads, said inductive means comprising a coil having a center tap connected with said lead, said coil having leads connecting its ends respectively to the cathodes of diode rectifiers, a condenser and resistance spanning said last mentioned means for maintaining the phase angle, leads connecting the anodes of said rectifiers to ground, said leads containing capacities, inductances respectively connected around said diodes and capacities, leads containing resistances connected respectively to said anodes, an electrodynamometer having a moving coil connected across said last mentioned leads, resistances and a common connection in a prolongation of said leads, the fixed coils of said electrodynamometer being connected in series between said common connection and ground.

9. Power measurement means for a high frequency circuit having power leads, and an output coil with a grounded center tap, said means comprising inductive means for deriving currents from each of said leads, the ends of said inductive means being connected respectively to two diode rectifiers, capacities connected in series with the output leads of all of said rectifiers to ground, and circuit means for deriving currents separately from said several rectifier output leads and applying said currents differentially to an electrodynamometer, said last mentioned connections including means for applying the currents from said output leads in opposition to the moving coil of said electrodynamometer, and additively to the fixed coils thereof, and in which said connections include resistive networks for combining the outputs of said several output leads to give a reading on the electrodynamometer which is the average of the currents derived from each of said high frequency power leads.

10. The apparatus claimed in claim 9 wherein said electrodynamometer has a magnetic core, and in which the fixed coils thereof have adjacent supplementary coils energized by currents which in their effect on the electrodynamometer are proportional to losses in the said high frequency power leads.

11. Apparatus claimed in claim 8 in which said electrodynamometer has an iron core, and in which supplementary coils, adjacent said fixed coils, are energized by currents which in their effect on the electrodynamometer are proportional to the losses in the leads of said high frequency power circuit.

12. In a power measurement system for high frequency circuits, in combination with a high frequency circuit having power leads, inductive means for deriving currents from an ungrounded one of said power leads, said inductive means comprising a coil having a center tap connected with said lead, said coil having leads connecting its ends respectively to the anodes of diode rectifiers, a condenser and resistance spanning said last mentioned means for maintaining the phase angle, leads connecting the cathodes of said rectifiers to ground, said leads containing capacities, inductances respectively connected around said diodes and capacities, leads containing resistances connected respectively to said anodes, an electrodynamometer having a moving coil connected across said last mentioned leads, resistances and a common connection in a prolongation of said leads, the fixed coils of said electrodynamometer being connected in series between said common connection and ground.

JOSEPH C. FROMMER.

REFERENCES CITED

The following references are of record in the file of this patent:

UNITED STATES PATENTS

| Number | Name | Date |
| --- | --- | --- |
| Re. 22,253 | Mittelman | Jan. 26, 1943 |
| 1,657,262 | Karapetoff | Jan. 24, 1928 |
| 1,871,710 | Lenehan | Aug. 11, 1932 |
| 2,443,097 | Crosby | June 8, 1948 |